United States Patent

[11] 3,599,899

| [72] | Inventor | Edward E. McCullough<br>Brigham City, Utah |
|---|---|---|
| [21] | Appl. No. | 839,783 |
| [22] | Filed | June 20, 1969 |
| [45] | Patented | Aug. 17, 1971 |
| [73] | Assignee | Thiokol Chemical Corporation<br>Bristol, Pa. |

[54] ROCKET CONTROL
7 Claims, 4 Drawing Figs.

| [52] | U.S. Cl. | 244/3.22 |
|---|---|---|
| [51] | Int. Cl. | F42b 15/18 |
| [50] | Field of Search | 244/3.22 |

[56] References Cited
UNITED STATES PATENTS

| 2,726,510 | 12/1955 | Goddard | 244/3.22 |
| 3,088,406 | 5/1963 | Horner | 244/3.22 X |
| 3,091,084 | 5/1963 | Eckhardt | 244/3.22 X |

*Primary Examiner*—Verlin R. Pendegrass
*Attorney*—Edward E. McCullough

ABSTRACT: A special upper stage for a plural-stage rocket includes apparatus for steering the entire rocket or any part thereof, and for igniting an extinguishable rocket motor as needed. It includes a gas generator from which gases may be proportionately metered to steering nozzles and/or to an ignition duct by valves responsive to movements of a central cam body, such that pressure within the gas generator always remains constant.

PATENTED AUG 17 1971
3,599,899
SHEET 1 OF 2
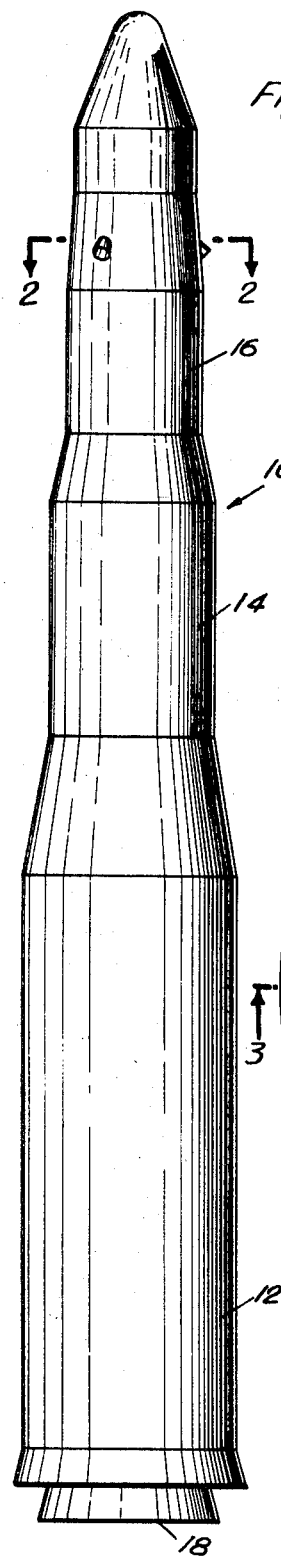
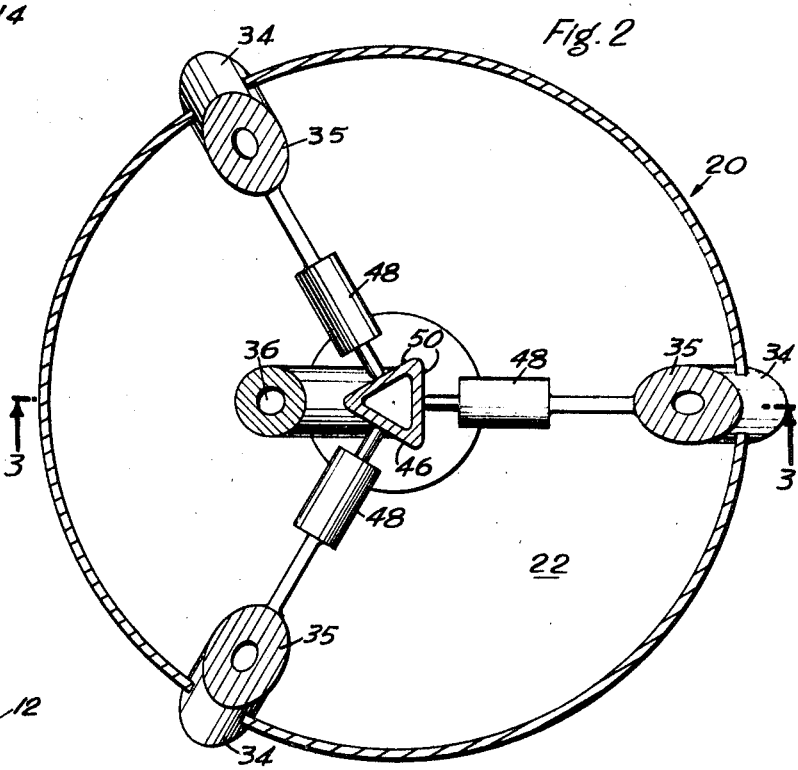
INVENTOR.
Edward E. McCullough
BY
Edward E. McCullough
AGENT INVENTOR.
Edward E. McCullough
BY Edward E. McCullough
AGENT

ROCKET CONTROL

BACKGROUND OF THE INVENTION

This invention relates to rocket controls, and particularly to apparatus incorporated into an upper stage that may not only be used for steering a plural-stage rocket, but also renders the upper stage fully controllable. The invention herein described was made in the course of or under a contract with U. S. Air Force.

Most plural-stage rockets have separate steering apparatus for each stage. Such an arrangement tends to be both heavy and complex. However, certain types of rockets can be steered advantageously by a single steering mechanism at the forward end. Such an arrangement is particular appropriate for long, plural-stage rockets, wherein the steering mechanism not only has considerable mechanical advantage about the center of mass of the rocket, but also minimizes weight and complexity by replacing individual steering means on each stage with a single mechanism.

Also, there has been recent recognition of the desirability of an upper stage that may be completely controllable after it is separated from the spent lower stages of the rocket. This is especially useful in placing objects into precise earth orbits, for example.

SUMMARY OF THE INVENTION

The present invention essentially combines these two functions (i.e., steering the entire rocket and providing a controllable upper stage) in one compact and simplified control mechanism. Cam followers, responsive to movements of a central cam body, operate values to meter gases from a gas generator to thrust nozzles for steering and/or to an adjacent, extinguishable rocket motor for ignition thereof. Moreover, this may be done in a manner such that the chamber pressure of the gas generator remains constant, to minimize the weight of its case or pressure vessel.

DESCRIPTION OF THE DRAWINGS

FIG. 1 is a general view of a plural-stage rocket in which the invention is installed.

FIG. 2 is an enlarged section taken on line 2–2 of FIG. 1;

THE PREFERRED EMBODIMENTS

Figure 3:
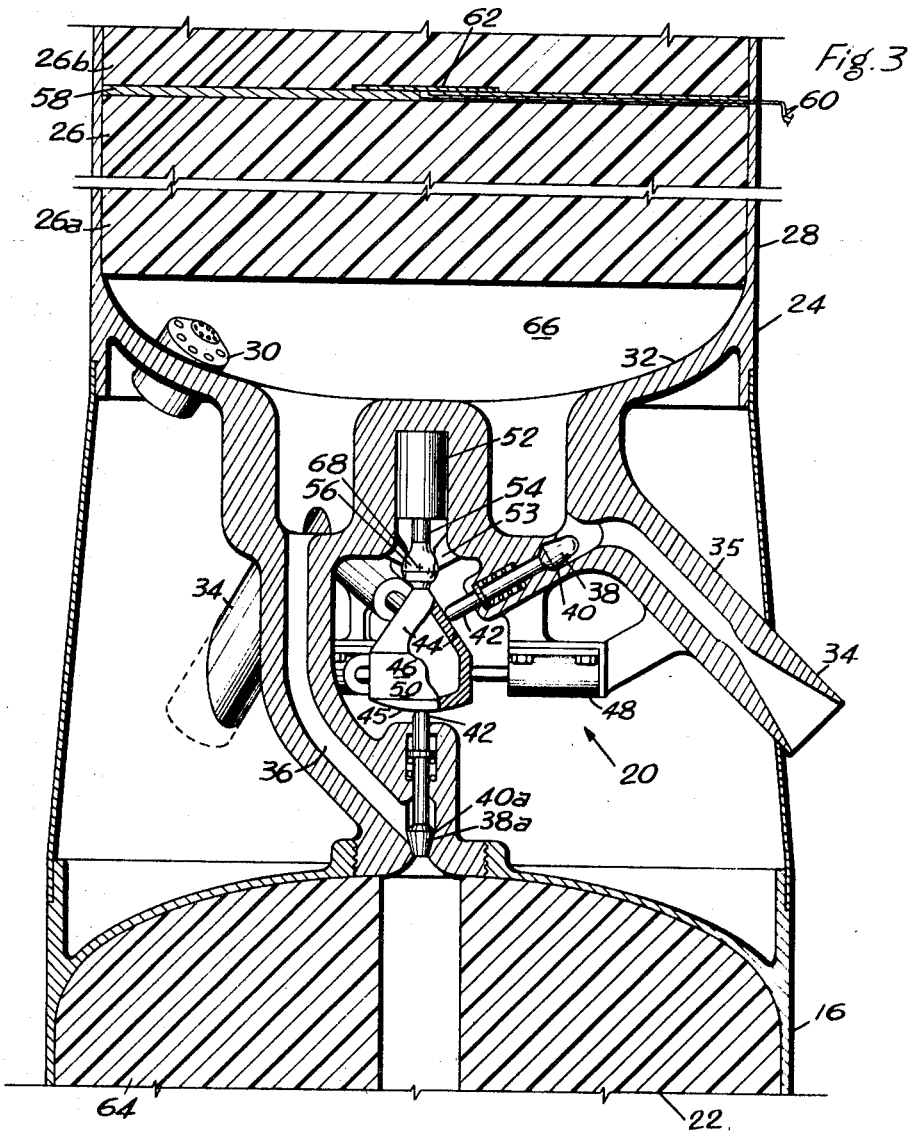
FIG. 3 is a fragmentary section taken on line 3–3 of FIG. 2.

FIG. 1 shows a conventional rocket 10, having three stages 12, 14, and 16 (first, second, and third stages, respectively). Each stage has a fixed-thrust nozzle 18, only that of the first stage being shown. The control apparatus 20 of the invention is mounted forward of the rocket motor 22 of the third stage 16. The rocket motor 22 is of the type having means of combustion extinguishment in flight. This extinguishment means for solid propellant is known in the art, and not being a part of the present invention, it is not shown. When certain propellants are used, extinguishment may be effected by lowering the pressure within the rocket by porting, for example.

In a preferred embodiment of the invention, shown in FIG. 3, a gas generator 24 has an end-burning, composite solid propellant grain 26 within a case 28, and a first igniter 30. The aft closure 32 of the gas generator 24 is equipped with three fixed, steering nozzles 34, equally spaced apart, radially oriented, and canted at about 45° to the axis of the rocket. An ignition duct 36 extends from the gas generator 24 to the interior of the third-stage motor 16, for igniting the motor 16 with hot gases from the generator 24. Blast tubes 35 for the steering nozzles 34 and the ignition duct 36 are valved by pintle valves 38, all spring-biased to a normally open position. Each of the valving members 40 is mounted on the end of a rodlike cam follower 42, which contacts an incline surface 44 of a central cam body 46. The only exception of the valving member 40a that operates the valve 38a in the duct 36; it is responsive to the spherical surface 45 of the cam body 46. The cam body 46 may be moved laterally by an combination of three fluid-operated, lateral actuators 48, mounted radially about it with their actuation arms in contact with bearing surfaces 50. A number of other arrangements are possible for the lateral actuation means, e.g., single-motion actuators including the use of springs. The cam body 46 may be moved axially by the double-acting, fluid-operated, axial actuator 52, mounted on the aft closure 32. The actuator has guide means, such as the tongue-in-groove slide 53, mounted on a stationary part of the rocket to prevent rotation of the actuation arm 54, which is also connected to the cam body 46 by a gimbal 56 to prevent rotation of the cam body about the axis of the rocket. The actuators, of course, may be attached to any stationary portion of the rocket.

In preferred practice, the rocket 10 is of the type wherein a considerable portion of its trajectory, after the first stage 12 and the second stage 14 are spent, is a powerless flight, as in a ballistic missile or a space rocket wherein the third stage 16 becomes part of a satellite or space probe to be operated at some later time. Hence, the composite solid propellant grain 26 of the gas generator 24 is divided into two parts, a fast-burning aft grain 26a and a slower burning forward grain 26b, by a combustion barrier 58. The first portion 26a, for steering the rocket during operation of the first and second stages 12 and 14, is made of more energetic propellant than the second portion 26b. The latter portion is ignited only after the spent first two stages have been separated from the rocket and, hence, it has lower power requirements. The second portion 26b of propellant may be ignited on electrical signal (via conductors 60) by a flat ignition means 62, bonded between the barrier 58 and the propellant 26b. The igniter 62 may be any of several well-known igniters, e.g., electrically ignited explosive fuse or magnesium wires with pyrotechnic compositions. The propellants 26a and 26b may be selected from any of a number of well-known, solid propellants having the required properties for their intended missions. The combustion barrier must be easily rupturable by gases generated by the igniter 62, and may be made of any of quite a number of materials, preferaBly one of the combustion-inhibiting compositions that form good adhesive bonds to the adjacent, typically rubber-base propellant compositions, e.g., the following mixture (expressed in weight percent) would be appropriate for this barrier:

| | |
|---|---|
| Carboxyl-terminated polybutadiene polymer | 83.0% |
| Tris [1-(2-methyl) aziridinal] phosphine oxide | 2.4 |
| Trifunctional epoxy resin | 1.6 |
| Asbestos floats | 10.0 |
| Iron octoate | 1.0 |
| Tri glyceride of hydroxy stearic acid | 2.0 |

This composition is heat-curable (about 173° F. for 24 hours), as is automatically bondable to the typical solid propellant having a rubber base; and, hence, it may be cast and cured with the propellant. Other propellant sources, such as a pressurized tank of liquid propellant, could also be used for the gas generator.

When the rocket is steered, the cam body 46 is maintained in its extreme aft position (see FIG. 2) so that the valve 38a in the ignition duct 36 is closed. The entire pressure of gases from the gas generator 24 is therefore metered as desired to the steering nozzles 34 by lateral movement of the cam body 46. When the propellant 64 of the upper stage motor 16 is to be ignited, the cam body 46 is moved forward by the axial actuator 52, simultaneously opening the valve 38a in the igniter duct 36 and closing the valves 38 to the steering nozzles 34.

An important feature of the invention is that the total orifice area for discharge of gases from the gas generator remains unchanged regardless of the movements of the cam body 46. Hence, pressure within the combustion chamber 66 always remains constant. Because of this feature, the case or pressure vessel 28 of the gas generator 24 may be designed to contain only the operating pressure produced by the faster burning propellant 26a, and need not be made heavy enough to contain the unpredictable peaks of pressure that may otherwise be produced during metering of the gases among various ports. This effect is achieved by cooperative action of (1) the instantaneous sizes of the valved orifices in the steering nozzles 34 and the ignition duct 36, and (2) the forms of the incline surfaces 44. The incline surfaces 44 that operate the valves 38 in the steering nozzles 34 are convergent, so that as the cam body 46 is moved in axial directions to operate the valve 38a in the ignition duct, the total orifice area in the nozzles 34 is decreased or increased in inverse proportion to that of the ignition duct 36. However, the total orifice area of the nozzles 34 and the duct 36 taken together is always constant. Also, the surface 45, which operates the valve 38a in the ignition duct 36, is spherical about the center of rotation 68 of the cam body 46, so that lateral movements thereof will not influence movements of that valve.

Figure 4:
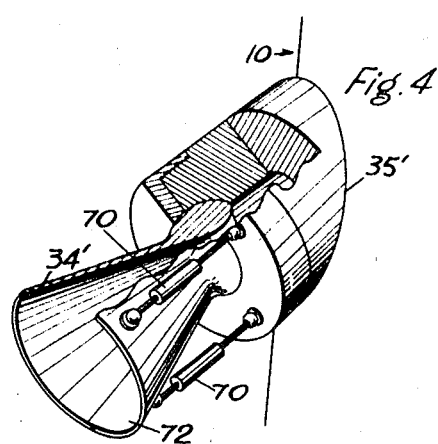
FIG. 4 is a fragmentary view of a modification of the steering nozzles shown in FIG. 3.

Modified steering nozzles 34' are shown in FIG. 4. These nozzles have ball-and-socket joints with their blast tubes 35'. Each is movable into any position within an imaginary cone by two actuators 70, spaced 90° apart on the nozzle 34' for moving it in two mutually perpendicular planes, and each attached by universal joint at one end to the exit cone 72 of that nozzle and at the other end to some stationary portion of the rocket 10. This modification renders the steering nozzles 34' much more versatile for certain applications, i.e., they become capable of imparting a greater range of selectable side forces to the rocket, reverse thrust, roll control, and even thrust to augment that of the primary rocket motors.

The invention I claim is:

1. An upper stage for a rocket, comprising:
    a rocket motor;
    a gas generator having a pressure vessel, a propellant source communicating therewith, and ignition means in the pressure vessel for igniting propellant;
    radially oriented steering nozzles extending from the pressure vessel for discharging gases therefrom;
    a duct connecting the interior of the pressure vessel with that of the rocket motor;
    a cam body having incline surfaces and positioned intermediately of the steering nozzles;
    an axial actuator mounted on the upper stage and pivotally connected to the cam body for moving it axially;
    lateral actuation means mounted on the upper stage and in contact with the cam body for moving it laterally;
    guide means for preventing axial rotation of the cam body;
    valve means in the steering nozzles;
    cam followers contacting the incline surfaces of the cam body and attached to the valve means in the steering nozzles for operation thereof in response to movements of the cam body; and
    a valve in the duct operatively connected to the axial actuator.

2. The upper stage of claim 1 wherein the cam body has a spherical surface opposite the incline surfaces and the valve in the duct is operatively connected to the axial actuator by a cam follower attached to the valve and in contact with the spherical surface.

3. The upper stage of claim 1 wherein axial motion of the cam body opens the valve in the duct as it closes the valve means in the steering nozzles, and vice versa, so that the total orifice area of the nozzles is always inversely proportional to that through which the duct discharges into the rocket motor, and so that the total orifice area through which gases may be exhausted from the pressure vessel always remains constant, whereby pressure of the gases in the pressure vessel may always be constant when the gas generator is in operation.

4. The upper stage of claim 1 wherein the source of propellant is a composite solid propellant grain in the pressure vessel, comprising:
    a fast-burning aft grain;
    a slow-burning forward grain;
    a combustion barrier of combustion-inhibiting material interposed between the aft and forward grains so that the forward grain cannot be ignited by combustion of the aft grain; and
    ignition means forward of the barrier for igniting the forward grain when desired.

5. The upper stage of claim 1 wherein the steering nozzles also extend rearwardly and are inclined about 45° to the axis of the rocket.

6. The upper stage of claim 1 wherein the steering nozzles are movable, and further including actuators joining the movable portions of the nozzles with stationary portions of the rocket for directing gases discharged from the gas generator.

7. The upper stage of claim 1 wherein the guide means comprises a gimbal connecting the cam body to the axial actuator and a tongue-in-groove slide connecting the gimbal to the upper stage for axial sliding motion.